(12) United States Patent
Homer

(10) Patent No.: US 6,912,528 B2
(45) Date of Patent: Jun. 28, 2005

(54) RECHARGEABLE MEDIA DISTRIBUTION AND PLAY SYSTEM

(76) Inventor: Gregg S. Homer, 3329 Coy Dr., Los Angeles, CA (US) 91423

(*) Notice: Subject to any disclaimer, the term of this patent is extended or adjusted under 35 U.S.C. 154(b) by 216 days.

(21) Appl. No.: 09/910,438

(22) Filed: Jul. 19, 2001

(65) Prior Publication Data

US 2002/0042730 A1 Apr. 11, 2002

Related U.S. Application Data

(63) Continuation-in-part of application No. 09/484,632, filed on Jan. 18, 2000.

(51) Int. Cl.[7] .............................................. G06F 17/30
(52) U.S. Cl. ........................... 707/9; 707/2; 707/104.1; 715/500.1; 715/501.1
(58) Field of Search ............................. 705/8; 707/2, 9, 707/10, 3, 104.1; 715/501.1, 513, 529, 500.1; 709/203; 345/302

(56) References Cited

U.S. PATENT DOCUMENTS

| | | | |
|---|---|---|---|
| 4,658,093 A | 4/1987 | Hellman | |
| 4,695,975 A | * 9/1987 | Bedrij | ...................... 715/500.1 |
| 4,868,736 A | 9/1989 | Walker | |
| 5,014,234 A | 5/1991 | Edwards, Jr. | |
| 5,564,038 A | 10/1996 | Grantz et al. | |
| 5,600,573 A | 2/1997 | Hendricks et al. | ...... 364/514 R |
| 5,613,089 A | 3/1997 | Hornbuckle | |
| 5,715,169 A | 2/1998 | Noguchi | |
| 5,754,649 A | 5/1998 | Ryan et al. | |
| 5,773,741 A | 6/1998 | Eller et al. | |
| 5,784,609 A | 7/1998 | Kurihara | |
| 5,790,423 A | 8/1998 | Lau et al. | ................ 364/514 R |
| 5,802,283 A | 9/1998 | Grady et al. | ........... 395/200.12 |
| 5,898,778 A | 4/1999 | Antonini | |
| 5,926,624 A | 7/1999 | Katz et al. | |
| 5,953,005 A | 9/1999 | Liu | |
| 6,289,333 B1 | * 9/2001 | Jawahar et al. | ................. 707/2 |
| 6,298,356 B1 | * 10/2001 | Jawahar et al. | ............. 707/201 |

OTHER PUBLICATIONS

Blackie, N. M. et al., "Research into Interactive Multimedia Customer Services on Demand for the Commercial Environment", IEEE Colloquium on Commercialising the Internet (Digest No.: 1997/063), Feb. 10, 1997, pp. 7/1–7/4.*
Knudsen, Craig, "MP3 Linux Players", Linux Journal—The Premier Magazine of the Linux Community, Jul. 1, 1999.*

* cited by examiner

Primary Examiner—Shahid Alam
(74) Attorney, Agent, or Firm—Townsend and Townsend and Crew LLP

(57) ABSTRACT

An electronic media distribution/play system includes a service facility that has a communications network interface and maintains a data file catalog. The catalog is sent over the network to requesting users, and the system processes payments from customers in establishing file access authorizations. Encrypted user-selected files and a player program are transmitted to each customer for metered access to received data files as limited by the authorization, and customers can make additional selections and play the encrypted files freely while the authorization remains established. The system can transmit the data files from local storage, and also provide links to encrypted files that are stored at remote vendor facilities. Authorizations can be for selected portions or class levels of the catalog, and for terms measured as calendar time, play time, and collective number of plays. Also disclosed is a method for facilitating the distribution and accessing of electronic files.

76 Claims, 5 Drawing Sheets

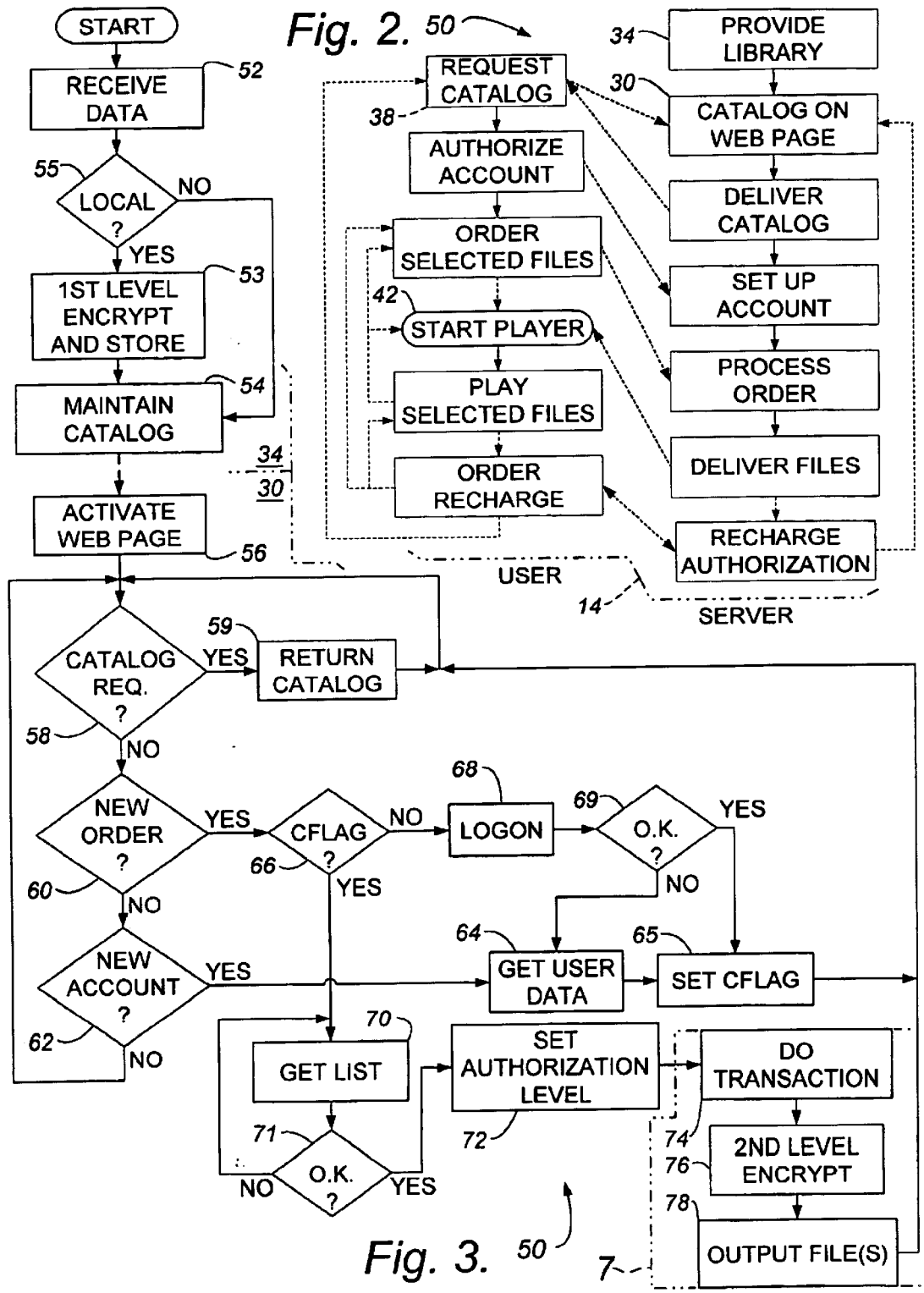

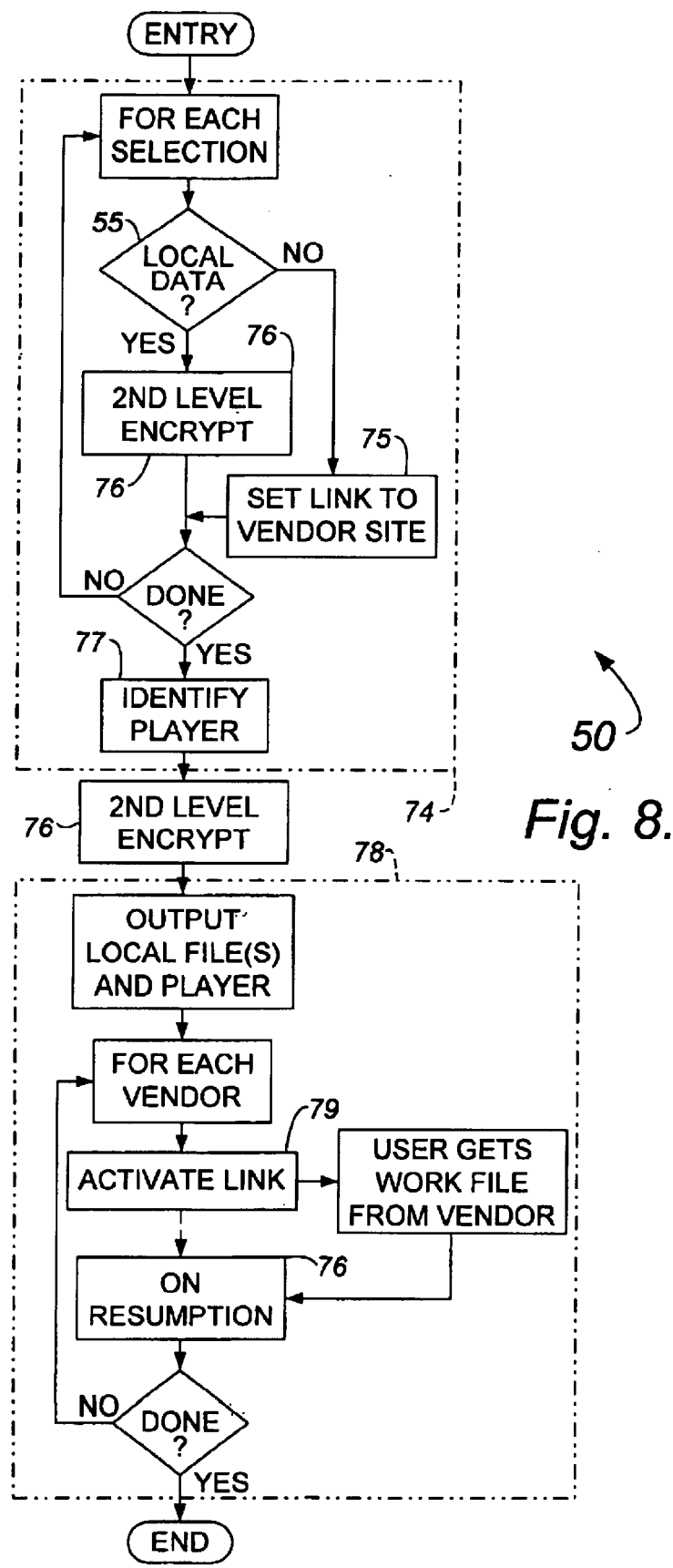

RECHARGEABLE MEDIA DISTRIBUTION AND PLAY SYSTEM

RELATED APPLICATION

This application is a continuation-in-part of application Ser. No. 09/484,632, filed on Jan. 18, 2000, which is incorporated herein by this reference.

BACKGROUND

The present invention relates to electronic media players, and more particularly to media that is downloadable over a communication network.

The distribution of software such as computer programs to be executed and data to be accessed has traditionally been by means of physical media that is either sold or rented. For example, computer programs are distributed on magnetic disks, and more recently on optical compact disks. Audio works such as musical recordings have been distributed on grooved records, magnetic tape, and compact disks; and movies have been distributed on magnetic tape and video disks of various formats. Often it is desired to restrict operation of the software to authorized users and/or for authorized uses. U.S. Pat. Nos. 5,014,234 to Edwards, Jr., 5,564,038 to Grantz et al., and 5,715,169 to Noguchi, for example, disclose various schemes for restricting copying and use of the software.

More recently, public access communication channels such as the Internet have been developed to the point that distribution of large volumes of software is feasible electronically. However, the protection of the software against unauthorized use and copying is typically awkward, bothersome, and ineffective. U.S. Pat. No. 5,790,423 to Lau discloses a system for downloading and playing music wherein certain copyrighted material may only be used for a specific length of time. The system of Lau includes a service center having a user accessible library of selectable programs, a base unit from which user generated program selections are transmitted to the service center, and a cassette for storing programs downloaded by the base unit from the service center. In one implementation, the date and time of downloading and playing of particular program selections is stored in memory of the base unit and/or the cassette. Copyright information is programmed into a control program of the cassette to limit the usage of each selected program. U.S. Pat. No. 4,898,736 to Walker discloses downloadable information having access through a keyed device.

These systems of the prior art exhibit a number of shortcomings, including one or more of the following:

1. They are difficult to use in that they require physical delivery of media and/or keys;

2. They are expensive to manage in that uses must be metered separately for particular works; and 3. They require undesirable compromises between the number of available works and the cost of obtaining access.

Thus there is a need for an electronic media distribution system that overcomes the disadvantages of the prior art.

SUMMARY

The present invention meets this need by providing a rechargeable media distribution and play system that is particularly efficient, versatile, and easy to use. In one aspect of the invention, the system includes a service facility having an electronically accessible catalog of electronic files, and an interface to a communications network. The system can transmit the catalog to a requesting user, and set up customer accounts, process payments from customers for establishing file access authorizations, and enables transmission user-selected files to customers. The system also provides a player program to each customer for metering access to received data files as limited by the authorization. Optionally, the system is enabled for transmitting the selected files to the customer only while the authorization remains established. The system can also be implemented for receiving the user request and feeding the catalog to the user via the network interface. Also, or alternatively, communications with the user for defining the user account can be through the network interface.

Preferably the system can set an authorization level of the customer's authorization to a first value corresponding to a first authorized plurality of the electronic files, and to a second value corresponding to a second plurality of the electronic files. The system can also provide augmenting the authorization in accordance with further processing of payments by the customer.

Preferably the system can, in defining the customer account, identify existing file access software to be used by the customer, and the player program is in the form of a software patch to be used in conjunction with the existing file access software. The identifying of the existing file access software can be by electronically interrogating a computer being used by the user to determine a default media player setting of that computer, the system selecting the software patch from a stored plurality of player patches.

Preferably the system enables transmissions of the data files and the player program in encrypted form, with the player program decrypting the received data files only while authorization remains established. Preferably the authorization is independent of both the selected files and the number of files selected among those that are authorized. Thus customers can freely access all of the files and play any of selected files, to the extent of a blanket authorization, which can also be recharged based on further payments.

Authorization can be only for a period of time which can be calendar time, optionally commencing upon use of the player program. Alternatively, the time is measured only during the accessing data of the received data files by the player program. In another alternative, authorization can be for a collective number of accesses of data of the received data files, and the numbered accesses can be counted only after a threshold period of time of accessing the data files.

Preferably the system processes renewals and extensions of customer authorizations in conjunction with processing of further payments from the customers.

The system can have storage of at least some of the data files at the service facility. Preferably the system facilitates transmission of at least some of the electronic files to customers from remote locations, preferably further including means for redirecting customer communications to remote source facilities over the network.

Another aspect of the invention provides a method for facilitating distribution of electronic files to be accessed, including providing the catalog of the electronic files for access by users of a communication network; defining a customer account for a user to identify the user as a customer, to process payments from the customer and to establish authorization for accessing an authorized plurality of the electronic files; enabling transmission of selected electronic files to the customer as received data files over the communication network in response to a customer order; and providing to the customer a player program for accessing and metering access to the received data files. The enabling can be for the selected electronic files to be transmitted in encrypted form, and providing with the player program means for decrypting the received data files.

The invention also provides a process for playing electronic media using the method described above wherein the authorization is for a predetermined length of time, the method further including activating the player program; monitoring elapsed time; and inhibiting operation of the player program when the elapsed time reaches the predetermined period. The monitoring can be only during the accessing of the received data files. The inhibiting can be suppressed until the end of a currently accessed data file.

The monitoring can be of calendar time, in which case the monitoring optionally commences only upon accessing of data of the received data files. Also, the inhibiting can be suppressed until the end of a currently accessed data file.

DRAWINGS

These and other features, aspects, and advantages of the present invention will become better understood with reference to the following description, appended claims, and accompanying drawings, where:

FIG. 2 is a block diagram of a distribution process using the system of FIG. 1;

FIG. 3 is a computer flow chart of a service facility distribution program for implementing the process of FIG. 2;

FIG. 8 is a flow chart showing further details of the distribution program of FIG. 3 within region 7 thereof.

DESCRIPTION

Figure 1:
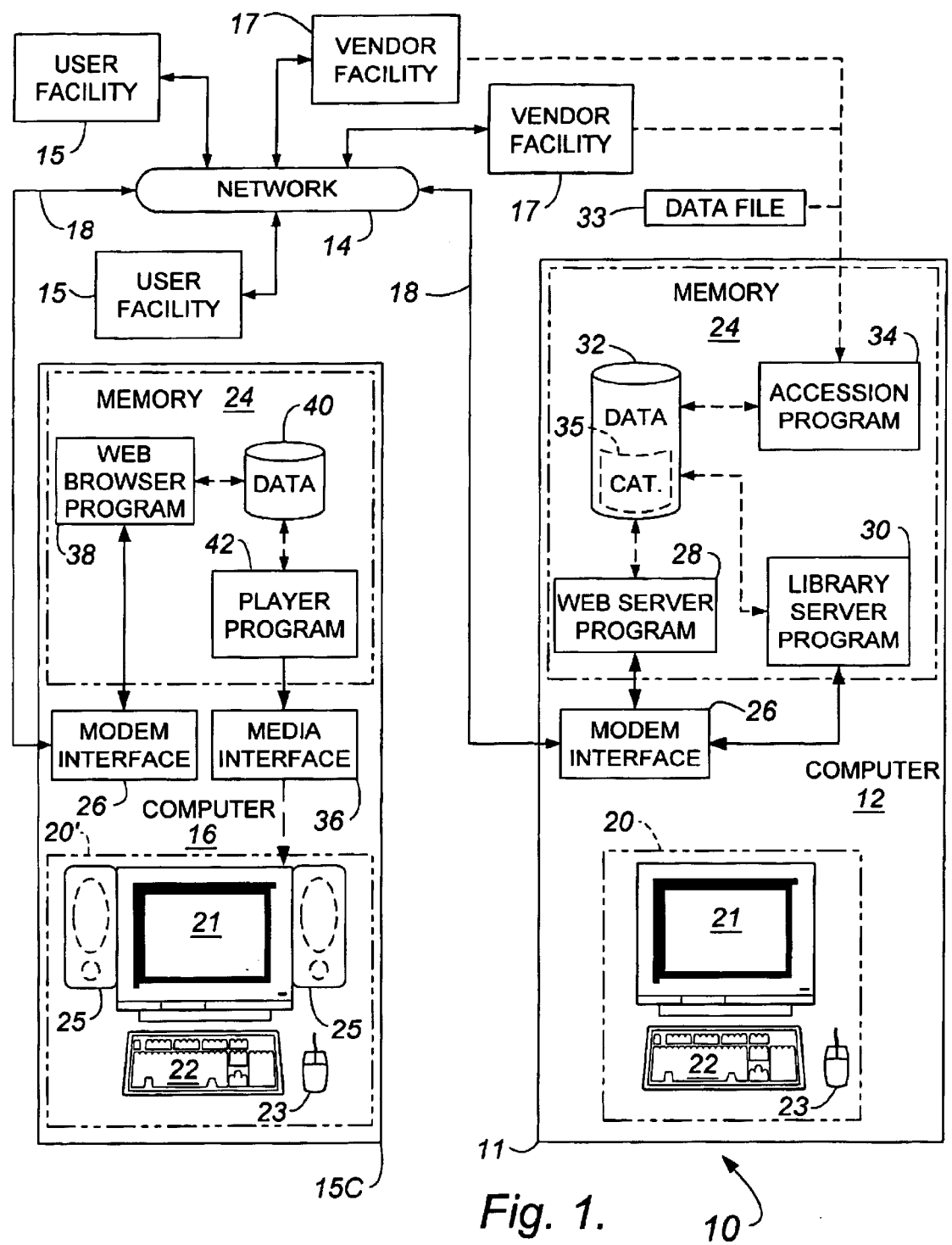
FIG. 1 is a pictorial block diagram of an electronic media distribution system according to the present invention.

The present invention is directed to a system for distributing and playing electronic media that is particularly efficient, easy to use, and effective in accommodating differing patterns of use. With reference to FIG. 1 of the drawings, a distribution system 10 includes a service facility 11 that can be implemented as a server computer 12 being connected to an electronic communication network 14, there being a plurality of user facilities 15 that can also be connected to the network 14, one such being designated customer facility 15C and being implemented as a customer computer 16. It is contemplated that a plurality of source or vendor facilities 17 are also connected to the communication network 14, such facilities being operated by holders of works to be distributed as facilitated by the system 10 of the present invention and further described below. Connections to the network 14 are by respective communication lines 18, which can be telephone utility lines. Connections can also be by satellite, cable, fiber, radio, cellular phone, in any combination. As shown in FIG. 2, the service computer 12 includes an operator interface 20 having a screen display 21, a keyboard 22, a mouse 23. The computer 12 also includes memory 24 and a modem interface 26 for connecting to the network through an available communication line 18.

The memory 24, at least some of which is typically non-volatile, has a web server program 28 and a library server program 30 having access to mass data storage 32 in accordance with the present invention. The mass data storage 32 is loaded with a library of data files (one such being designated 33) by an accession program 34, the accession program also generating a catalog 35 that is periodically updated and saved in the data storage 32. As further described below in connection with FIGS. 3 and 7, some or all of the data files can be retained in the vendor facilities 17.

The customer computer 16 includes a counterpart of the operator interface, designated 20', the memory 24, and the modem interface 26. In addition to having counterparts of the screen display 21, keyboard 22, mouse 23, the operator interface 20' includes a pair of audio speakers 25, the computer 16 further including a media interface 36 for driving the speakers 25. In an exemplary implementation of the customer computer 16, the memory 24 has a web browser 38 by which data made available by the service facility 11 is accessed and saved in a suitable mass storage device such as a conventional hard disk drive 40. In further accordance with the present invention, the memory 24 of the customer computer receives a media player program 42 for conditionally accessing received data as further described below. It will be understood that the player program 42 can be in the form of a program "patch" or "plug-in" to be used in conjunction with a commercially and/or publicly available media player. Media players are known devices for accessing media files. In the context of this application, media files are electronic files that are typically digital in form, and include, without limitation: a) books and other text-only material; b) music, audio books, and other audio-only material; c) films, television programming, and other audio-visual material; d) games and other interactive material; and e) software programs. In the case of software programs, it will be understood that the media player 42 functions somewhat as an operating system for encrypted programs. Suitable software media players to be patched with counterparts of the media player 42 include WINAMP PLAYER, available from AOL Time Warner of New York, N.Y.; WINDOWS MEDIA PLAYER, available from Microsoft Corp. of Redmond, Wash.; and REALPLAYER, available from RealNetworks, Inc., of Seattle, Wash. These players play music files, whether compressed in the known MP3 format or otherwise, and the WINDOWS and REALPLAYER players also play audio-visual files. Book and text-only files can be played on the Software Reader software of Gemstar eBook Group, Redwood City, Calif., and the Adobe Acrobat eBook Reader 2.2, available from Adobe Systems, Inc. of San. Francisco, Calif. Games and interactive material can be played on Dreamcast, available from Sega of America Dreamcast, Inc. of San Franciaco, Calif., and Sony PlayStation, available from Sony Corp. of New York, N.Y.

With further reference to FIGS. 2–4 and 8, a distribution process 50 is provided wherein the accession program 34 maintains a library of recordings and a user of the customer computer 16 interacts with the library server program 30 of the server computer 12 over the network 14. It will be understood that the library server program 30 and the accession program 34 can be respective modules of an integrated computer program. As shown in FIG. 3, the accession program 34 is programmed to include a receive data step 52 in which bibliographic data and, optionally, full records, of one or more works to be distributed are received in computer-readable form such as on a digitally recorded compact disk. As described above in connection with FIG.

1, the data can also be transmitted from one or more of the vendor facilities 17 via the computer network 14, or by any suitable means. When the the complete work is included, the data is subjected to a first level of encryption, being stored in the data file 33 in an encrypt and store step 53. Finally, the catalog 35 is updated in a maintain catalog step 54 for including the new work(s). A test local step 55 is interposed after the receive data step 52 for bypassing the encrypt and store step 53 when the data includes bibliographic information but not the full record of particular works, the bibliographic information in such cases including URL fields or other suitable data for enabling subsequent user access to full encrypted records of such works. It will be understood that the test local step 55 can be omitted when all of the data either includes the full records or does not include any full records. Also, catalog listings for new versions of previously accessioned works normally replace previous listings (except older versions for which further user access is to be permitted). Once the catalog 35 reflects current status of the data file 33, the library server program 30 is entered for activating a network web page by which users can communicate with the distribution system 10, in an activate web page step 56. Such communication is diagramed in FIG. 2. FIG. 8 shows further details of user communication including delivery of works from vendor facilities 17, and FIG. 8 shows communication that includes shared file transfer between users of the delivery system 10.

A user accessing the web page is presented with an election to receive a listing of the catalog 35. Accordingly, the process 50 includes a test catalog request step 58 for determining such user request, in which case the catalog is provided in a return catalog step 59. It will be understood that the return catalog step 59 can be performed by simply transmitting a listing of the catalog 35 over the computer network 14 to the requesting user, the browser 38 automatically opening and displaying a file containing the listing in a conventional manner. Alternatively, an option can be provided for the user to request a hard copy of the catalog 35 to be mailed, in which case the process 50 proceeds to obtain appropriate mailing information from the user. It will be understood that in either case, the user can be given the option to select a portion only of the catalog that contains one or more categories of subject matter, author, artist, publisher, etc., and whether or not "new releases" are to be included. Program control is passed from the return catalog step 59 to the test catalog request step 58 for handling further catalog requests by the user, if any, and as further described herein. A user accessing the web page is also presented with an election to place a new order. Accordingly, the process 50 includes a test order step 60 for determining such user request, which is processed as described below. The user is further presented with an election to open a new account. Accordingly, the process 50 includes a test account step 62 for determining such user request. If the user has not requested any of the three, control is returned to the request catalog step 58, the process 50 thus looping and waiting for another user request.

When the user has requested a new account, control is passed to a get user data step 64 in which the user provides identification data and payment authorization in a conventional manner and, optionally, a desired authorization level that can define a number of plays, a period of time (which can be play time or calendar time, for example), and premium options such as whether play of "new releases" is to be authorized. Also, the payment authorization can selectively enable automatic periodic or repeated payments for "recharging" of the authorization. Once the user's account is established, a customer flag for that user is set in a set cflag step 65 with control passing to the test catalog request step 58 for further processing of that user's transactions. It will be understood that the customer flag (or other associated stored variable(s)) can be further set according to details of the authorization, and/or further to define that user's requirements regarding the player program 42. For example, the user's computer can be interrogated (and/or the user can be asked) to identify its default media player, for selection of a "plug-in" version of the media player 42 to be used as a software patch on the user's identified default media player. In either case a "stand-alone" counterpart media player 42 is optionally selectable.

In the case that the user requests a new order, control is passed from the test new order step 60 to a test cflag step 66. If the customer flag for that user has not yet been set, control passes to a logon step 68 in which the user enters a customer identifier and password which are compared in a test logon step 69 with data previously received in the get user data step 64. If the logon is unsuccessful, control is passed to the get user data step 64, it being assumed that the user had not previously established an account. In case the user had previously established an account yet failed to properly logon, the process 50 can include an appropriate recovery procedure according to methods known in the art. Once logon is successfully completed, control is passed from the test logon step 69 to the set cflag step 65 in which the customer flag is set for that user (now confirmed as a customer) as described above. As further described above, control is returned from the set cflag step 65 to the test catalog request step 58 as before in anticipation of the user requesting placement of a new order as a customer, control being passed successively by the new order step 60 to the test cflag step 66 which, in the case of the customer flag having been set, control is passed to a get list step 70 wherein the customer selects items from the catalog 35 to be downloaded over the computer network 14 to the mass storage device 40 of the customer computer 16. (It is also contemplated that integrity checks of customers can be made at any time the customers are communicating on the network 14.) Upon a detected violation of customer integrity, a command can be transmitted for disabling the customer's media player 42, the customer's authorization can be canceled, the customer's media player 42 can be reset or re-calibrated to block extension of the authorization, or the authorization can be reduced to match a correct remaining authorization as determined at the service facility 11.

In making selections, the customer can search for particular works by category, author, artist, publisher, etc. In the case of music, searching can also be by lyrics and melody. In the case of films, by title, genre, actor, director, writer, producer, music composer, decade released, etc. In the case of books, by author, title, publisher, or text. It will be understood that when the customer flag (or associated customer data) contains restrictions on use, such as accessing catalog items that are not "new releases", only items that are consistent with the customer's authorization level are permitted to be selected. Alternatively, other items can be selected and downloaded, but not accessed unless and until the customer's authorization is augmented appropriately. The customer is invited to approve of his selections in a test list step 71 from which control is returned to the get list step 70 in case the customer is dissatisfied with his previous selection; otherwise, control is passed to a set authorization level step 72 in which an authorization variable is set in accordance with previously established payment authorizations as determined in the get user data step 64.

Next, control is passed to a do transaction step 74 in which selected files are copied from the data file 33 (for locally stored works). The selected data files are then further encrypted, preferably in a manner that permits decryption only by the particular customer, such as by public-private key encryption or other suitable means, in a second level encrypt step 76. Alternatively, such as when data files are to be encrypted alike for all customers, only a single encryption is needed, which can be done in the first level encrypt and store step 53 or the second level encrypt step 76. The files as thus encrypted are then transmitted over the computer network 14 in an output files step 78. Users, that are new customers also receive appropriate codes and/or software (the player program 42) for enabling playback of the works. As further security against unauthorized file access, a new key or coding element can be added or substituted to both the media files and the media player 42 each month. (This addition or substitution is contemplated to be made to the player 42 one month prior to that for the media files to facilitate customer subscriptions for variable subscription months rather than the same month periods for all customers.) This helps insure against tampering with the player to render it perpetually charged, because it could then play files then resident but not those thereafter obtained. Also, a periodic integrity check would reveal a lack of current key(s) and/or coding, in which case the player can be disabled. It will be understood that the term "player program 42" is inclusive of stand-alone file access software, software patches including portions of the exemplary player program 42 as described below in connection with FIG. 4, and variant counterparts thereof as further described in connection with FIGS. 5 and 6, to be used in conjunction with a conventional or commercial media player or other file access software to be run by the customer computer 16C, or otherwise operated by the customer. The term is further inclusive of any hardware and/or software device or appliance that the customer may use to access encrypted files having been delivered as facilitated by operation of the system 10 of the present invention.

With particular reference to FIG. 8, an exemplary configuration of the distribution process 50 has the transaction step 74 including a program loop executing, for each catalog selection, a counterpart of the test local step 55 for branching to a set link step 75 in which a universal resource locator (URL) is derived (or copied) from the catalog data for that selection. Typically, the URL is to an encrypted full record of the selection that is maintained at one of the vendor facilities 17 being accessible via the computer network 14. It will be understood that more than one such URL may be associated with a particular work when the work is available from plural vendors, additional URLs facilitating access to such works when there is excessive network traffic directed to particular vendors. Encryption of the files at the vendor facilities can be done individually by counterparts of the second level encrypt step 76 as described above, or single encrypted copies of each work can be transmitted from the vendor facilities 17 as also described above in connection with FIG. 3. Further, it is contemplated, particularly in implementations of the present invention that use the same encryption of data files for multiple customers, that customers will be permitted to copy and play encrypted files from other customers, so long as appropriate authorization remains in effect. Thus the vendor facilities 17 and the computers of other customers are sometimes collectively referred to as source facilities. In cases wherein the sharing customers do not operate web pages of their own, an e-mail request can be used in place of an ordinary URL. The transaction step 74 is completed, when the program loop is done processing the customer's library selections, by determining in an identify player step which, if any, counterpart of the player program 42 is to be transmitted to the customer. This determination is based on interrogation of the customer flag (described above in connection with the set cflag step 65 of FIG. 3) which can contain the identity of the customer's default media player, if any, as well as the customer's authorization level, and whether the customer is a new customer (not previously receiving a counterpart of the media player 42). Also or in the alternative, the customer flag (or other suitable variable) can signify whether the authorization level has changed and/or whether the customer's default (or otherwise identified) media player has changed, in which cases a new download of a media player 42 counterpart is to be performed.

Following the transaction step 74 as implemented in FIG. 8, the second level encrypt step 76 is repeated, if necessary, to uniquely encrypt the identified counterpart media player 42 for the currently requesting customer. As described before, this on-line encryption is not required if no media player counterpart is to be transmitted in the current session, or to the extent that the same encryption can be transmitted to plural customers, in which case it is contemplated that some other unique or quasi-unique code(s) are to be transmitted with a generically encrypted counterpart of the media player 42. When the customer's authorization is to be "recharged" an entirely new media player 42 can be downloaded, or merely codes or other control information to modify a previously downloaded player 42.

Thus the media distribution system 10 of the present invention preferably provides for retention of some or all of the data files 33 at vendor facilities 17, for facilitating quality control, record keeping, and marketing activities by operators of the vendor facilities 17. Methods of record keeping include tracking of data by the host server, setting of cookies on customers' computers, either alone or in combination. The data can include customer identity (by real name or pseudonym), the number of downloads to the customer's computer, the number of uploads vrom the customer's computer, and the number of plays of each media file. With respect to the data files 33 being retained at vendor facilities 17, the accession program 34 does not process and store the data, but does generate records of the catalog 35 as described above. Royalty payments to those having rights in the data files 33, whether stored at the service facility 11, at vendor facilities 17, or elsewhere, can be made from funds received by the customers, and the payments can be allocated commensurate with conventional practice, being prorated for example according to the frequency of selection of particular works by the customers. Allocations can also be based on the number of plays of works belonging to particular copyright holders, the number of downloads of such works, the total playing time of such works, or any combination thereof.

It will be understood that in implementations integrating the library accession and server programs 30 and 34, when the outcome of the test account step 62 is negative control may be returned to the receive data step 52 instead of the test request step 58, with provision for an interrupt redirection to the return catalog step 59, the user data step 64, and the test cflag step 66 for servicing corresponding user requests being offered on the web page.

Figure 4:
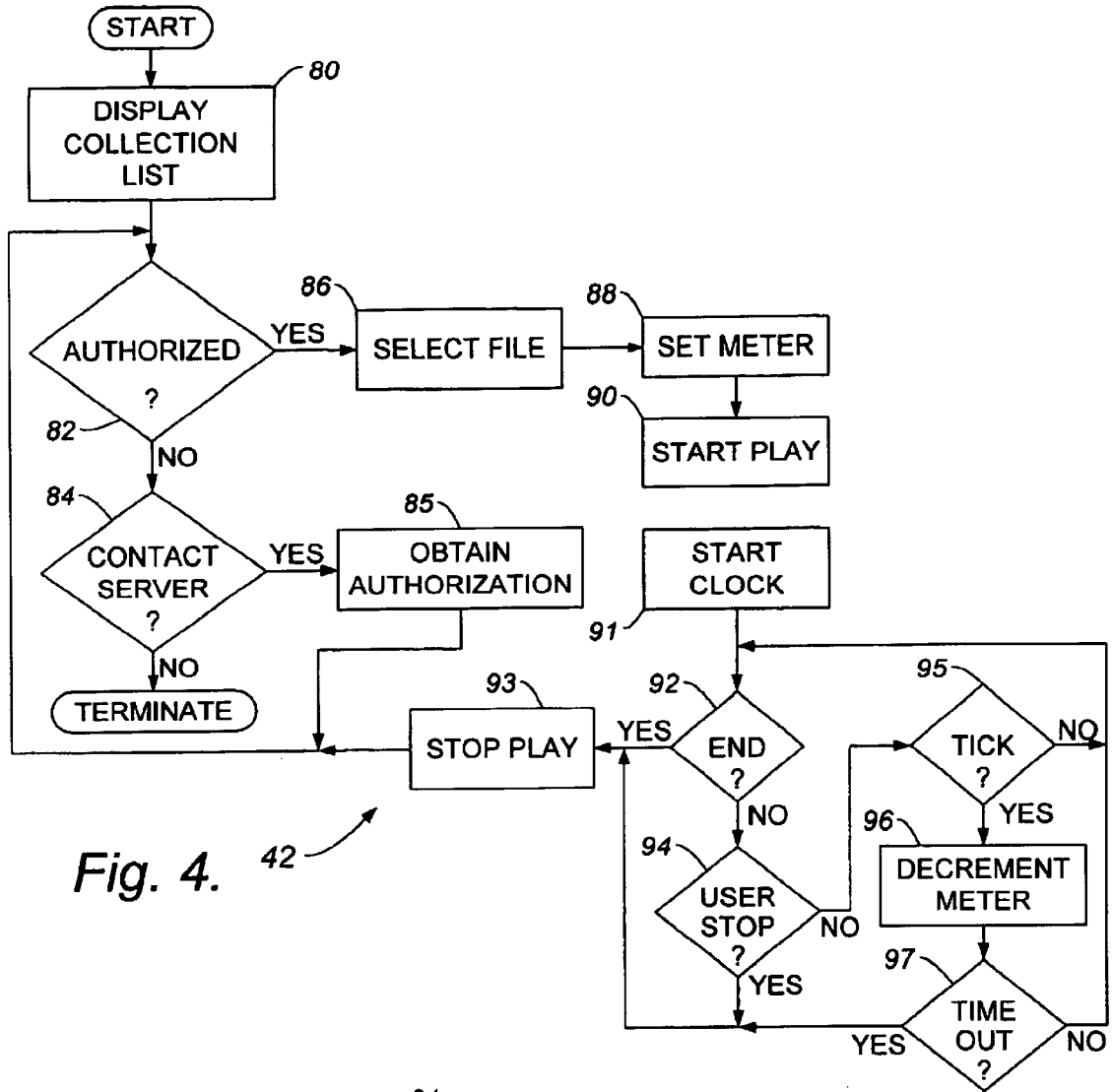
FIG. 4 is a flow chart of a customer facility media player program for implementing the process of FIG. 2.

With particular reference to FIG. 4, the player program 42 is implemented for permitting the user to freely play whatever files of the catalog 35 he has downloaded from the server computer 12 and/or any of the vendor facilities 17 as enabled or otherwise facilitated by the delivery system 10, until a composite authorization for play is expended. It will be understood that the composite authorization may change, such as when a customer account previously authorized to play "new releases" is recharged at a lower level. Also, the system 10 may be implemented to play preview portions only of some works unless and until a higher authorization is purchased. In the exemplary implementation of FIG. 4, the authorization is in the form of a total elapsed time of play. Accordingly, the player program 42 includes a display collection list step 80 in which all files previously downloaded from the server computer 12 are displayed on the screen display 21 of the customer computer 16. This list step 80 can also incorporate search and/or navigation capabilities for facilitating customer review of certain portions of the list when it is particularly long. Next, the program 42 verifies current authorization to play a selected file in a test authorization step 82. If authorization is not current, control is passed to a test server contact step 84 wherein the user is invited to establish network contact with the server computer 12, in which case the program 42 waits in an obtain authorization step 85 for authorization to be obtained or appropriately augmented; otherwise, the player program 42 is terminated. From the obtain authorization step 85 control is returned to the test authorization step 82 for verification of the authorization, in which case control is passed to a select file step 86 for determining which of the listed files the user wishes to have played. Once the selection is made, control passes to a set meter step 88, which in the case of the exemplary implementation of FIG. 3, transfers a currently available play time as authorized to a clock register that is maintained by the player program 42. In this implementation an appropriate setting is the number of minutes of play authorization currently available to the user. The selected file is then accessed and played, with decryption, in a start play step 90 and a timer is activated in a start clock step 91, with control passing to a test end step 92 for testing whether play of the selected file has run to completion, in which case termination of play is processed in a stop play step 93 (the clock is deactivated), with the user's currently remaining play authorization being updated, control being returned to the test authorization step 82 at which point the user is invited to select another file, etc. until he either terminates the program or runs out of authorization as described below.

The user is also provided with an option to terminate play prior to the end of the file in a test user stop step 94, in which case control is transferred to the stop play step 93. As play continues, with negative outcomes of the test end step 92 and the test user stop step 94, a test tick step 95 determines whether the clock has run for a predetermined time (one minute in the current example), in which case the meter that was previously set in the set meter step 88 is decremented in a decrement meter step 96. Otherwise, control is returned to the test end step 92. Following the decrement meter step 96, the meter is tested for underflow in a test timeout step 97. If not, control is returned to the test end step 92; otherwise, control is passed to the stop play step 93 for termination of the play.

When the media player 42 is to be supplied as a patch counterpart to be run in conjunction with an existing media player or other resident file access device of the customer, the essential included elements are that portion of the start play step 90 that permits decryption of files being played, and means for terminating play upon expiration of necessary authorization (such as the steps 82, 84, 85, 88, 91, 95, 96, and 97 of FIG. 4). Other aspects of navigation of the encrypted files can be controlled by the previously resident program, although the patch counterpart preferably is set for principally (such as by a default file folder) accessing only those files whose delivery is facilitated by the delivery system 10 of the present invention. Although the patch could also be set for exclusive access of files associated with the system 10, it is also preferred that pre-existing functions of the customer's resident file access device remain operational. If the customer's authorization expires, the plug-in patch implementation of the media player 42 ceases to function, preferably leaving the resident access device to function as if the patch had not been applied.

Figure 5:
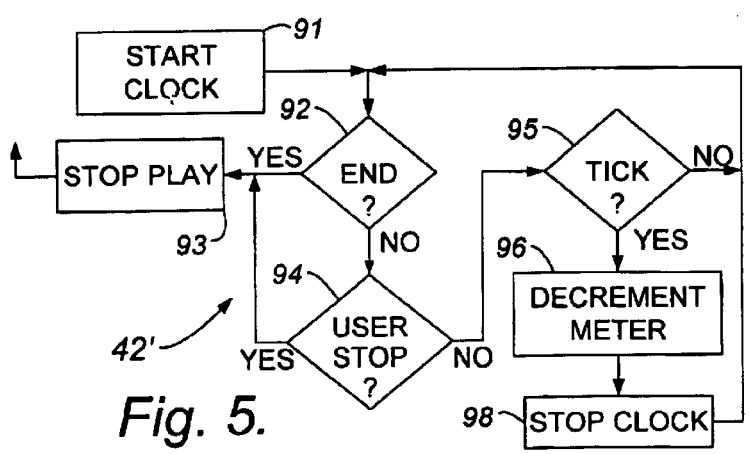
FIG. 5 is a flow chart portion showing an alternative configuration of the player program of FIG. 4.

With further reference to FIG. 5, an alternative implementation of the player program, designated 42', provides a predetermined number of plays (25, for example) rather than a predetermined play time. In this implementation, the meter is set in the set meter step 88 to the current available number of plays. The program 42' proceeds as described above in connection with FIG. 4 through the start clock step 91, the test end step 92, the test user stop step 94 to the test tick step 95 for testing whether a threshold period of time has elapsed from the start clock step 91 for avoiding debiting of the user's authorizations until play has proceeded for an introductory period of time. Once that introductory time has elapsed, the test tick step 95 reaches an affirmative result, with control passing to the decrement meter step 96 in which the play authorization is decremented by one. In the alternative implementation of FIG. 5, control passes from the decrement meter step 96 to a stop clock step 98 for stopping the clock so as to limit the decrementing of the meter to a single unit for each file played.

In another alternative, the play authorization is for a period of time as in the implementation of FIG. 4, but with play continuing to the end of a file being played when timeout occurs. In this case, the test timeout step 97 is omitted from the implementation of FIG. 4, control returning directly from the decrement meter step 96 to the test end step 92.

The player program 82 can utilize a conventional clock of the customer computer 16C in the start clock step 91 and the test tick step 95, for example by storing a counterpart of the system time in the start clock step 91, and comparing that counterpart with current system time in the test tick step 95, finding a positive outcome when the time difference reaches a predetermined interval (one minute in the example described previously). In connection with the positive outcome, the stored counterpart of the system time can be incremented by one minute for subsequent comparisons in a next tick interval. Of course, the stored counterpart can alternatively be initially set in the start clock step 91 to one minute ahead of the system time for facilitating the comparison by detecting a change in sign of the difference between the values in the test tick step 95. This approach is impervious to errors or intentional offsetting of the system time from actual time that may be present in the customer computer 16C prior to execution of the start clock step 91. To guard against unauthorized resetting of system time during playing time, there are several alternatives. For example:

1. Use a separate software clock that is responsive to a system timer interrupt;

2. The above in combination with a periodic integrity check of the software clock program instructions;

3. Either of the above in combination with periodically relocating the software clock program instructions and registers;

4. Any of the above in combination with downloading of new encrypted timer software in each activation of the output files step of the library server program 30; and 4. Requiring use of a clock or system time of the server computer 12 during operation of the player program 42.

Instead of having the authorizations be for a predetermined amount of playing time, it is also contemplated, even preferred, to have authorizations based on calendar time, in which case there is a need to guard against resetting of system time whether or not the player program 42 is in operation. For this purpose, the library server program can be implemented to provide an encoded counterpart of the system time (and date) of the server computer 12, as well as an expiration time, in the output files step 78 (whether for downloading data files or just for recharging). The player program 42 can then make comparisons between the system times, taking appropriate action in the event that there is a significant change in the difference. It will be understood that in implementations based on calendar time there is no requirement for monitoring elapsed playing time as described above in connection with FIGS. 4 and 5. However, such monitoring can be utilized for allocating royalty payments and/or for guarding against resetting of the system time (because usage time should never exceed elapsed calendar time).

Figures 6, 7:
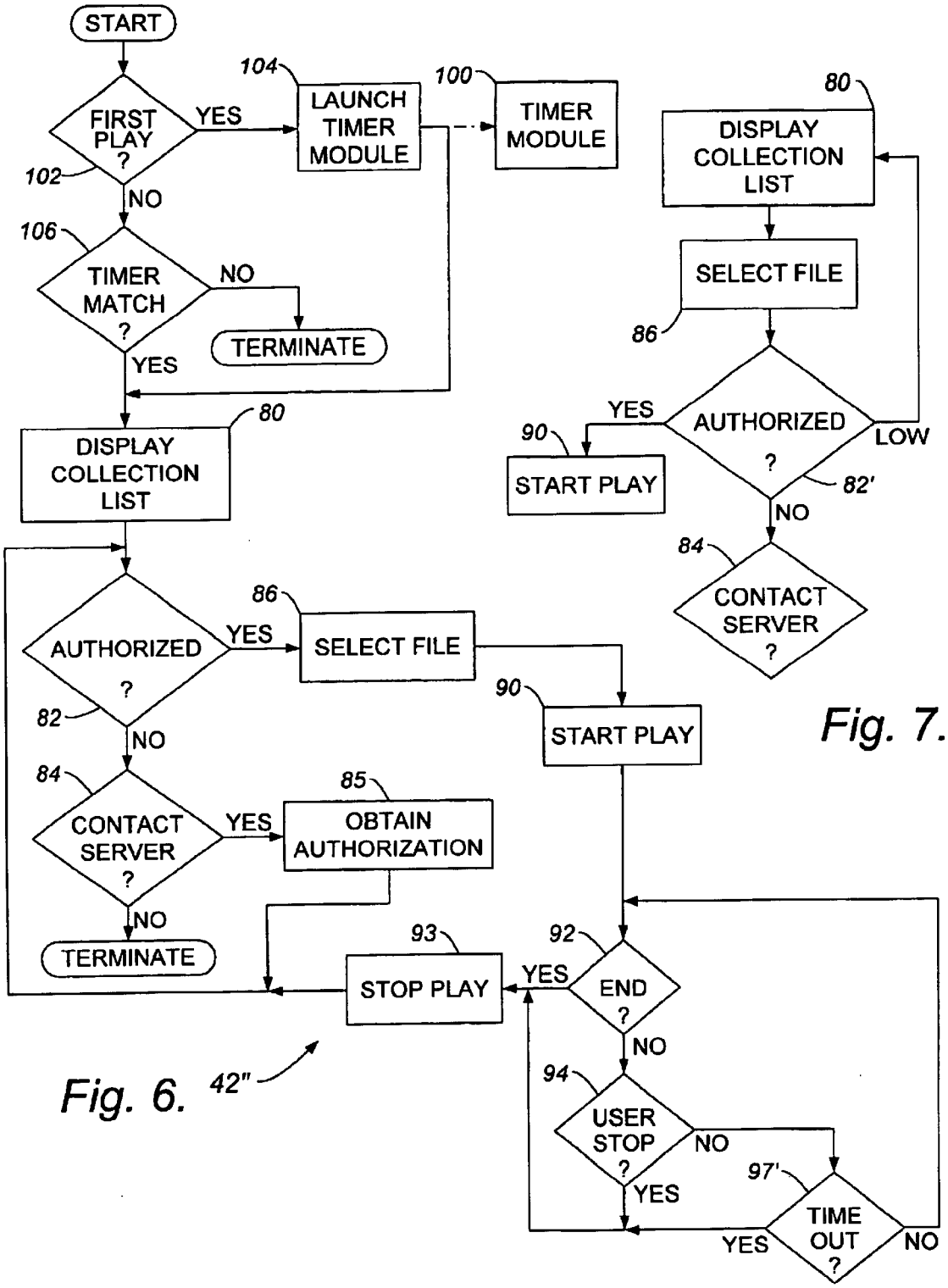
FIG. 6 is a flow chart showing another alternative configuration of the player program of FIG. 4.
FIG. 7 is a flow chart showing an alternative configuration of a portion of the player program of FIG. 6.

With further reference to FIG. 6, another counterpart of the player program, designated 42", has a timer module 100 associated therewith, the timer module 100 being implemented to run when the customer computer 16C is operating, notwithstanding the player program 42" being inactive. As shown in FIG. 6, upon starting the player program 42", a determination is made of whether the program is being run for the first time by the customer computer 16C in a test first play step 102, in which case a launch timer module step 104 generates and stores appropriate files for implementing and running the timer module 100, using programming elements that are known to those having skill in the art. Accordingly, the timer module 100 is restarted whenever the computer 16C is subsequently booted-up or restarted, the module 100 monitoring a system date and time of the computer 16C as well as separately maintaining a timer calendar date and time. The timer calendar date and time is automatically advanced by a difference between the system date and time and a corresponding date and time last saved in a previous period of running of the timer module 100.

When the test first play step 102 has a negative outcome (on a subsequent starting of the player program 42") control passes to a test timer step 106, wherein the presence and operation of the timer module 100 is verified, and an appropriate match of the timer date and time with the system date and time is determined, in which case control is passed to the display list collection step 80, described above in connection with FIG. 4; otherwise, the player program 42" is terminated based on unauthorized tampering with calendar/time settings. The player program 42" of FIG. 6 is implemented for operation with authorizations based on calendar time, with the set meter, start clock, test tick, and decrement meter steps 88, 91, 95, and 96 of FIG. 4 being omitted. Thus control passes directly from the select file step 86 to the start play step 90; from the start play step 90 to the test end stop 92; and from a negative outcome of the test user stop step 94 to a counterpart of the timeout test step, designated 97'. In the timeout test step 97', the calendar date and time of the timer module 100 is compared with termination date and time as currently authorized, with control returning to the test end step 92 or the stop play step 93 as described above in connection with FIG. 4. It will be understood the timeout test step 97' (as well as the test user stop step 94) can be omitted when it is desired that play continue to the end of a particular data file, control passing from a negative result of the test user stop step 94 to the test end step 92.

Thus the player program 42" as shown in FIG. 6 provides additional protection against unauthorized tampering with calendar and time settings of the customer computer 16C. Further protection can be provided by including, in the obtain authorization step 85, a comparison of the calendar date and time of the timer module 100 and/or the system time of the customer computer 16C with the system time and date of the server computer 12, with termination in the event that tampering is detected. Similarly, the above comparison would be performed in the get list step 70, the set authorization step 72 and/or the do transaction step 74 of the distribution process 50, with the process being terminated as to customers that are determined to have attempted to misuse the process.

With further reference to FIG. 7, an alternative configuration of the player program 42" has a counterpart of the test authorization step, designated 82', implemented for determining authorization but not for the selected file. In this alternative, the select file step precedes the test authorization step 82', and if the authorization is insufficient (low), control is returned to the display list step 80. If sufficient authorization is present, control passes to the start play step 90; otherwise, the test server cantact step 84 is performed as before in the implementation of FIG. 6.

It is further contemplated that a standalone device can be provided for implementing all or appropriate functions of the customer computer 16C, in which case a battery powered system clock can be implemented in a secure manner for setting only in accordance with the system time of the server computer 12. (Such device in implementations according to FIGS. 4 and 5 would not require the clock to be settable to date and time of day.)

In a most preferred implementation of the present invention, authorizations can be purchased by customers on a monthly basis, with payments either made conventionally by check, etc., by phone, or on-line, with the system being configured for automatic debiting of bank accounts and credit accounts as authorized by the customers. While the authorizations remain in effect, customers are free to visit the service facility web site, download unlimited encrypted digital media files as authorized, play those files unlimited times, and share those files with friends (who are able to play them when and so long as THEY have purchased authorization).

Rather than require prospective customers to learn a new media player, they are invited user to visit the service facility website, identify their default music player, and download the media player 42 in the form of a software plug-in for that player. The plug-in enables the customer's player to play encrypted music files, or more generally to access encrypted electronic files of any supported type. The patch preferably provides additional buttons in the user's player, including "Company Home," "Share Music," and "Burn CD." The "Company Home" button opens the Company homepage, wherefrom the customer can search for and download music files as the encrypted data files 33, and purchase authorizations. The "Share Music" button launches an e-mail dialogue box with a space for destination addressee, a space for a message, and a menu of the sender's music files and compilations for easy attachment to the message. More particularly, the attachment only has a set of links to the music files on servers of the service facility 11 and/or source facilities such as vendor facilities 17. Recipients would then download the files directly from such server. Preferably the service facility 11 is copied with these e-mails for maintenance of such links as alternate sources for the encrypted data files 33. Alternatively, actual media file attachments to e-mail communications between customers are possible, such "pier-to-pier" transfers correspondingly reducing communication traffic with the service facility 11 and the vendor facilities 17.

The "Burn CD" feature invites the customer to burn an encrypted music file or compilation from his hard drive. Any user of the "burned" CD would still be required to be an authorized customer to access such copied media files.

In summary, the present invention includes up to three software components which can be delivered to the customer's computer vis download from a central server, via download from other customers on a "pier-to pier" (P2P) basis, or vis a removable drive medium such as a disk or CD-ROM. These three components are: (a) the media player 42, as a stand-alone application or as a patch; (b) a program that simultaneously compresses media files for efficient transfer (such as compression of CD files to MP3 format) and encrypts the result into a proprietary format; and (c) a program that encrypts unencrypted media files into the proprietary format as and when such files are downloaded to the customer's computer. Other software elements, such as those for maintaining the catalog 35, and for establishing and maintaining customer accounts, are not contemplated to be delivered to customers, although some or all of these elements can potentially be distributed to one or more of the vendor facilities 17, and/or being retained at the service facility 11.

The above-described ability of the service facility 11 to provide network links to remote source facilities from which customers receive selections as encrypted files advantageously allows vendors such as record companies to house encrypted music files on their own servers, for enhanced quality control, record keeping, and marketing options. The distribution system 10 of the present invention does this while providing a single catalog (or portions thereof) in which to search the offerings of multiple suppliers of electronic files. The link occurs through the Company domain and/or a back channel and preferably retains a frame around the user's screen with buttons for "Company Home," "Search Music," "Browse Music," etc., the browse option providing preview play of possible selections.

Although the present invention has been described in considerable detail with reference to certain preferred versions thereof, other versions are possible. For example, kiosks can be provided for dispensing and/or recharging standalone devices that serve in place of at lease some of the customer computer 16C. Also, the data files, suitably encrypted, can be provided from the service facility 11 or other suitable source in the form of a CD or other form of removable drive medium, for play on the standalone devices and/or customer computers 16C. Further, usage can be limited or metered based on the number of media files downloaded, or the total size of the files downloaded, as well as elapsed calendar time and elapsed usage time, or any combination of these measures. Therefore, the spirit and scope of the appended claims should not necessarily be limited to the description of the preferred versions contained herein.

What is claimed is:

1. A system for facilitating distribution and accession of electronic files, comprising:
   (a) a service facility having an electronically accessible catalog of the electronic files, and a network interface for communicating over a communications network;
   (b) means for transmitting the catalog in response to a user request;
   (c) means for defining a customer account for a user to identify the user as a customer, to process payments from the customer and establish authorization for accessing an authorized plurality of the electronic files;
   (d) means for receiving from the network interface an order from the customer requesting selected ones of the electronic files;
   (e) means for enabling transmission of the selected files by the network interface to the customer as received data files; and
   (f) means for providing to the customer a player program for accessing the received data files, the player program being implemented for metering access to the received data files as limited by the authorization,
   wherein the means for defining a customer account comprises means for electronically interrogating a computer being used by the user to determine a default media player setting of that computer.

2. The system of claim 1, wherein the means for transmitting the selected files is enabled only while the authorization remains established.

3. The system of claim 1, wherein the means for transmitting the catalog is connected to the network interface for receipt of the user request therefrom and feeding the catalog thereto.

4. The system of claim 1, wherein the means for defining the user account is operatively connected to the network interface for communications with the user.

5. The system of claim 4, wherein the means for defining the customer account comprises means for setting an authorization level of the authorization to a first value corresponding to a first authorized plurality of the electronic files, and to a second value corresponding to a second plurality of the electronic files.

6. The system of claim 5, further comprising means for augmenting the authorization in accordance with further processing of payments by the customer.

7. The system of claim 4, wherein the means for defining the customer account comprises means for identifying existing file access software to be used by the customer, and wherein the player program is in the form of a software patch to be used in conjunction with the existing file access software.

8. The system of claim 1, wherein the means for enabling the transmission comprises means for encrypting the electronic files and the player program comprises means for decrypting the received data files, the means for decrypting being operable only while the authorization remains established.

9. The system of claim 1, wherein the authorization is independent of the selected ones of the data files within the authorized plurality of electronic files.

10. The system of claim 9, wherein the authorization is further independent of the number of the selected ones of the data files.

11. The system of claim 9, wherein the authorization is for a period of time.

12. The system of claim 11, wherein the period of time is calendar time.

13. The system of claim 12, wherein the period of time is measured only upon accessing data of the received data files by the player program.

14. The system of claim 11, wherein the period of time is measured only during accessing data of the received data files by the player program.

15. The system of claim 9, wherein the authorization is for a collective number of accesses of data of the received data files.

16. The system of claim 15, wherein the number of accesses are counted only after a threshold period of time of accessing each of the received data files.

17. The system of claim 1, further comprising means for renewing and/or extending the authorization in accordance with further processing of payments by the customer.

18. The system of claim 1, further comprising means for storing at least some of the electronic files at the service facility.

19. The system of claim 1, further comprising means for facilitating transmission of at least some of the selected files to the customer from remote locations.

20. The system of claim 19, wherein the means for facilitating transmission comprises means for redirecting network communication with the customer from the service facility to a source facility over the communications network.

21. A method for facilitating distribution of electronic files to be accessed, comprising:
(a) providing a catalog of the electronic files for access by users of a communication network;
(b) defining a customer account for a user to identify the user as a customer, to process payments from the customer and to establish authorization for accessing an authorized plurality of the electronic files;
(c) enabling transmission of selected electronic files to the customer as received data files over the communication network in response to a customer order; and
(d) providing to the customer a player program for accessing and metering access to the received data files as limited by the authorization, wherein a computer being used by the user is electronically interrogated to determine a default media player setting of that computer.

22. The method of claim 21, wherein the enabling is for the selected electronic files to be transmitted in encrypted form, the method further comprising providing with the player program means for decrypting the received data files only while the authorization remains established.

23. The method of claim 21, wherein the authorization is independent of a number of the received data files within the authorized plurality of electronic files.

24. A process for accessing electronic files using the method of claim 21 wherein the authorization is for a predetermined period of time, the process further comprising:
(a) activating the player program;
(b) monitoring elapsed time; and
(c) inhibiting operation of the player program when the elapsed time reaches the predetermined period.

25. The method of claim 24, wherein the monitoring is only during accessing of data of the received data files.

26. The method of claim 25, wherein the inhibiting is suppressed until the end of a currently accessed data file.

27. A process for playing or accessing electronic media using the method of claim 25, further comprising:
(a) activating the player program; and
(b) under user control, operating the player program to effect the augmenting or restoring the authorization.

28. The method of claim 24, wherein the monitoring is of calendar time.

29. The method of claim 28, wherein the monitoring commences only upon accessing of data of the received data files.

30. The method of claim 28, wherein the inhibiting is suppressed until the end of a currently accessed data file.

31. A process for playing or accessing electronic media using the method of claim 30, further comprising:
(a) activating the player program; and
(b) under user control, operating the player program to effect the augmenting or restoring authorization.

32. A system for distributing and playing electronic media, comprising:
(a) a service facility having an electronically accessible library of data files, an electronically accessible catalog of the data files, and a network interface for communicating over a communications network;
(b) means for transmitting the catalog in response to a user request;
(c) means for defining a customer account for a user to identify the user as a customer, to process payments from the customer and establish authorization for accessing the library;
(d) means for receiving from the network interface an order from the customer requesting selected ones of the data files;
(e) means for transmitting the selected files by the network interface to the customer as received data files; and
(f) means for providing to the customer a player program for accessing the received data files, the player program being implemented for metering access to the received data files as limited by the authorization,
wherein the means for defining a customer account comprises means for electronically interrogating a computer being used by the user to determine a default media player setting of that computer.

33. The system of claim 32, wherein the means for transmitting the selected files is enabled only while the authorization remains established.

34. The system of claim 32, wherein the means for transmitting the catalog is connected to the network interface for receipt of the user request therefrom and feeding the catalog thereto.

35. The system of claim 32, wherein the means for defining the user account is operatively connected to the network interface for communications with the user.

36. The system of claim 32, wherein the means for transmitting comprises means for encrypting the data files and the player program comprises means for decrypting the received data files, the means for decrypting being operable only while the authorization remains established.

37. The system of claim 32, wherein the authorization is independent of the selected ones of the data files.

38. The system of claim 37, wherein the authorization is further independent of the number of the selected ones of the data files.

39. The system of claim 38, wherein the authorization is for a period of time.

40. The system of claim 39, wherein the period of time is measured only during accessing data of the received data files by the player program.

41. The system of claim 38, wherein the authorization is for a collective number of accesses of data of the received data files.

42. The system of claim 41, wherein the number of accesses are counted only after a threshold period of time of accessing each of the received data files.

43. The system of claim 32, wherein the means for defining the customer account further comprises means for augmenting or restoring the authorization.

44. The system of claim 43, wherein the player program is further implemented for activating the means for augmenting or restoring.

45. A method for distributing electronic media to be played, comprising:

providing the media at a service facility as an electronically accessible library of data files;

(a) providing a catalog of the library files;

(b) defining a customer account for a user to identify the user as a customer, to process payments from the customer and to establish authorization for accessing the library;

(c) providing selected data files from the library to the customer as received data files in response to a customer order; and (d) providing to the customer a player program for accessing and metering access to the received data files, wherein a computer being used by the user is electronically interrogated to determine a default media player setting of that computer.

46. The method of claim 45, wherein the step of providing a catalog includes enabling access to the catalog by users of a communication network.

47. The method of claim 46, wherein the step of providing selected data files comprises transmitting the data files over the communication network.

48. The method of claim 45, wherein the step of providing the player program comprises providing a player device having the player program implemented therein.

49. The method of claim 45, further comprising encrypting the data files, and providing with the player program means for decrypting the received data files only while the authorization remains established.

50. The method of claim 45, wherein the authorization is independent of a number of the received data files.

51. A process for playing electronic media using the method of claim 45, wherein the authorization is for a predetermined period of time, the process further comprising:

(a) activating the player program;

(b) monitoring elapsed time only during accessing of data of the received data files; and (c) inhibiting operation of the player program when the elapsed time reaches the predetermined period.

52. The system of claim 51, wherein the inhibiting is suppressed until the end of a currently accessed data file.

53. A process for playing electronic media using the method of claim 45 wherein the authorization is for a predetermined period of calendar time, the process further comprising:

(a) activating the player program;

(b) under user control, selecting a data file to be played;

(c) monitoring a calendar time;

(d) playing a selected file; and (e) inhibiting operation of the player program when the calendar time reaches termination of the predetermined period.

54. The method of claim 53, wherein the inhibiting is suppressed until the end of a currently accessed data file.

55. The system of claim 45, wherein the defining of the customer account further comprises augmenting or restoring the authorization.

56. A system for distributing and playing electronic files, comprising:

(a) a service facility having an electronically accessible library of files, an electronically accessible catalog of the files, and a network interface for communicating over a communications network;

(b) means for transmitting the catalog in response to a user request;

(c) means for defining a customer account for a user to identify the user as a customer, to process payments from the customer and establish authorization for accessing the library;

(d) means for receiving from the network interface an order from the customer requesting selected ones of the data files;

(e) means for transmitting the selected files by the network interface to the customer as received files; and (f) means for providing to the customer an access program for accessing the received files, the access program being implemented for metering access to the received files as limited by the authorization, wherein the means for defining a customer account comprises means for electronically interrogating a computer being used by the user to determine a default media player setting of that computer.

57. The system of claim 56, wherein the means for defining the customer account further comprises means for augmenting or restoring the authorization.

58. The system of claim 57, wherein the player program is further implemented for activating the means for augmenting or restoring.

59. A method for distributing electronic files to be accessed, comprising:

(a) providing the files at a service facility as an electronically accessible library of files;

(b) providing a catalog of the library files;

(c) defining a customer account for a user to identify the user as a customer, to process payments from the customer and to establish authorization for accessing the library;

(d) providing selected ones of the library files from the library to the customer as received files in response to a customer order; and (e) providing to the customer an access program for accessing and metering access to the received files, wherein a computer being used by the user is electronically interrogated to determine a default media player setting of that computer.

60. The system of claim 59, wherein the defining of the customer account further comprises augmenting or restoring the authorization.

61. A system for facilitating distribution and accession of electronic files, comprising:

(a) a service facility having an electronically accessible catalog of the electronic files, and a network interface for communicating over a communications network;

(b) means for transmitting the catalog in response to a user request;

(c) means for defining a customer account for a user to identify the user as a customer, to process payments from the customer and establish authorization for accessing an authorized plurality of the electronic files;

(d) means for receiving from the network interface an order from the customer requesting selected ones of the electronic files;

(e) means for enabling transmission of the selected files by the network interface to the customer as received data files; and (f) means for providing to the customer a player program for accessing the received data files, the player program being implemented for metering access to the received data files as limited by the authorization, wherein the means for defining the user account is operatively connected to the network interface for communications with the user, the means for defining the customer account comprises means for identifying existing file access software to be used by the customer, and the player program is in the form of a software patch to be used in conjunction with the existing file access software, and the means for identifying the existing file access software comprises means for electronically interrogating a computer being used by the user to determine a default media player setting of that computer, and the means for providing the player program comprises selecting the software patch from a stored plurality of player patches.

62. The system of claim 61, wherein the means for defining the customer account comprises means for setting an authorization level of the authorization to a first value corresponding to a first authorized plurality of the electronic files, and to a second value corresponding to a second plurality of the electronic files.

63. The system of claim 62, further comprising means for augmenting the authorization in accordance with further processing of payments by the customer.

64. The system of claim 61, wherein the means for enabling the transmission comprises means for encrypting the electronic files and the player program comprises means for decrypting the received data files, the means for decrypting being operable only while the authorization remains established.

65. The system of claim 61, wherein the authorization is independent of the selected ones of the data files within the authorized plurality of electronic files.

66. The system of claim 65, wherein the authorization is further independent of the number of the selected ones of the data files.

67. The system of claim 65, wherein the authorization is for a period of time.

68. The system of claim 67, wherein the period of time is calendar time.

69. The system of claim 68, wherein the period of time is measured only upon accessing data of the received data files by the player program.

70. The system of claim 67, wherein the period of time is measured only during accessing data of the received data files by the player program.

71. The system of claim 65, wherein the authorization is for a collective number of accesses of data of the received data files.

72. The system of claim 71, wherein the number of accesses are counted only after a threshold period of time accessing each of the received data files.

73. The system of claim 61, further comprising means for renewing and/or extending the authorization in accordance with further processing of payments by the customer.

74. The system of claim 61, further comprising means for storing at least some of the electronic files at the service facility.

75. The system of claim 61, further comprising means for facilitating transmission of at least some of the selected files to the customer from remote locations.

76. The system of claim 75, wherein the means for facilitating transmission comprises means for redirecting network communication with the customer from the service facility to a source facility over the communications network.

* * * * *